Sept. 30, 1969  I. LÖFGREN  3,469,440
STRESS MEASURING DEVICE
Filed March 21, 1967

INVENTOR.
INGEMAR LÖFGREN
BY
Bailey, Stephens & Huettig
ATTORNEYS

United States Patent Office 3,469,440
Patented Sept. 30, 1969

3,469,440
STRESS MEASURING DEVICE
Ingemar Löfgren, Vasteras, Sweden, assignor to Allmänna Svenska Elektriska Aktiebolaget, Vasteras, Sweden, a Swedish corporation
Filed Mar. 21, 1967, Ser. No. 624,832
Claims priority, application Sweden, Apr. 4, 1966, 4,469/66
Int. Cl. G01n 33/18
U.S. Cl. 73—88.5
2 Claims

ABSTRACT OF THE DISCLOSURE

For measuring torque or stress in a body of magnetostrictive material having a hole therein, a measuring device comprises a body of insulating material insertable in the hole and having a core system with at least four pole surfaces situated in the same transverse plane of the body.

BACKGROUND OF THE INVENTION

Field of the invention

The invention relates to a device insertable in a hole in a body of magnetostrictive material to measure torque or stress therein.

In order to measure torque or compressive stresses in objects of magnetostrictive material, a cylindrical hole is bored in the object substantially parallel to the mechanical stresses. In the hole is placed a cylindrical measuring body in principle consisting of four substantially rod-shaped magnetic cores separated from each other and having individual windings. The magnetic cores are arranged parallel with a diameter of the hole and the windings are connected together in pairs, one pair of windings being intended to be connected to an AC source and the other pair to a measuring device. In a plane through the measuring body perpendicular to the magnetic cores, these cores will be in the corners of a quadrangle, the diametrically opposite windings of the magnetic cores being connected together. When alternating current flows through one pair of windings two heterogeneous, symmetrical magnetic fluxes are generated in the surface of the hole. The symmetry line of the magnetic fluxes forms an angle of about 45° with the longitudinal direction of the hole.

The ends of the four magnetic cores may in principle be said to form two diametrically situated measuring zones which are connected to each other internally through the measuring body itself and also through the walls of the cylindrical hole.

To permit the measuring body to be inserted into the measuring object there must be a certain space between the measuring body and the walls of the hole. Consequently the measuring body is able to move, even if only negligibly, perpendicularly to the longitudinal direction of the hole. If this movement takes place parallel to the magnetic cores it has no influence on the measuring signal. The movement causes a decrease in reluctance in one measuring zone and a corresponding increase in the other measuring zone, but due to the above mentioned internal connection the sum of the alterations in reluctance is zero.

If, however, the movement occurs in a direction perpendicular to the magnetic cores unbalance occurs in the connection between the two measuring zones through the walls in the cylindrical hole and gives rise to a disturbance of the measuring signal.

The present invention relates to a measuring device of the above mentioned type where the disadvantage of disturbances in the measuring signal arising under certain conditions is eliminated. The measuring device comprises a magnetic core system provided with at least one excitation winding connected to an alternating voltage source and at least one measuring winding connected to a measuring means. Essentially new in the invention is that the magnetic core system has at least four pole surfaces all situated in one and the same diametrical plane of the cylindrical hole.

Figure 1:
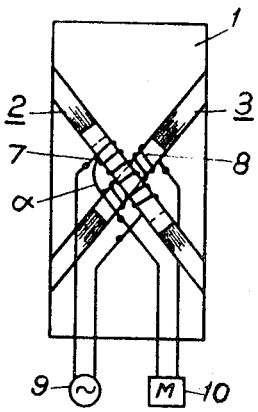
Figure 1:
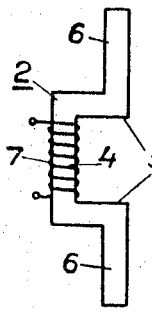
Figure 1:
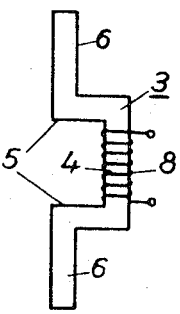
Figure 1:
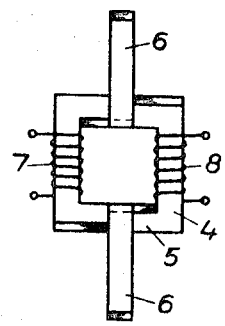
Figure 1:
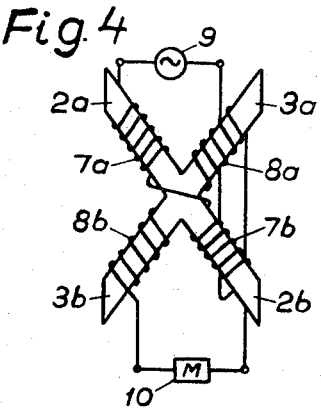
Figure 1:
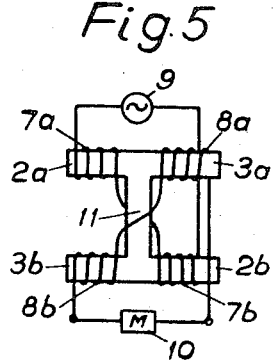

In the accompanying drawing FIGURE 1 shows a schematic longitudinal section through a measuring device according to the invention in which the magnetic core system is built up of two separate magnetic cores. FIGURES 2a and 2b show the two magnetic cores separately, while FIGURE 3 shows them together. FIGURES 4 and 5 show one embodiment according to the invention where the magnetic core system consists of two cores formed as a unit.

The measuring device according to FIGURE 1 consists of a cylindrical body 1 and two magnetic cores 2 and 3 enclosed in this body. As is best seen from FIGURES 2a and 2b, each core consists of a central part 4, two perpendicular legs 5 leading from this central part and two end parts 6 perpendicular to the legs 5 and parallel to the central part 4. The cores 2 and 3 are each provided with a winding 7 and 8, respectively, on the central part 4. The winding 7 is connected to an AC source 9 while the winding 8 is connected to a measuring means 10.

In the measuring device the two cores 2 and 3 are arranged as shown in FIGURE 3, so that the central parts 4 provided with windings are as far away from each other as possible and the core ends 6 are situated in the same diametrical plane. With this form and positioning of the cores, the least possible magnetic connection is obtained between them. The cores are cast in a body 1 of suitable insulating material which has been machined to such a diameter that the measuring device can be inserted in the hole provided for it in a measuring object with the least possible play. The zero voltage of the device depends on the angle between the cores and it has been found that a minimum is obtained when the angle α of FIGURE 1 is about 96°. The value may vary somewhat and depends partly on the material of the object to be measured.

In the embodiment shown in FIGURE 4 the magnetic core system forms a cross composed of the four core parts 2a, 2b and 3a, 3b. The winding for each core is suitably divided into two parts 7a, 7b and 8a, 8b, respectively. Since the cores are formed as a unit a more stable construction is obtained. Of course, this also causes a certain magnetic connection between the excitation part and the measuring part in the measuring device, but the signal caused by this in the measuring winding can be substantially compensated electrically in the measuring device.

The two cores may also be combined as shown in FIGURE 5 so that the magnetic core system forms an H. The excitation part of the measuring device consists of the core parts 2a, 11 and 2b and the winding parts 7a and 7b, while the measuring part consists of the core parts 3a, 11 and 3b and the winding parts 8a and 8b.

I claim:
1. Device for measuring torque or compressive stresses in an object of magnetostrictive material provided with a cylindrical hole which device comprises a cylindrical body adopted to be inserted in said hole, a magnetic core system within said body provided with at least one excitation winding connected to an alternating voltage source and at least one measuring winding connected to a measuring means, said magnetic core system having at least four pole surfaces adjacent the cylindrical surface of the body, all said pole surfaces being situated substantially in the same plane, which plane is parallel with the longitudinal axis of the cylindrical body, the magnetic core system including two cores (2, 3), which are similar and each of which comprises a central part (4) and two legs

(5) perpendicular to the central part and extending therefrom in the same direction, each of said two legs being provided with a core end portion (6) perpendicular to the legs (5) and parallel to each other and to the central part (4), each of said core end portions having its free end shaped as a pole surface.

2. Device for measuring torque or compressive stresses in an object of magnetostrictive material provided with a cylindrical hole which device comprises a cylindrical body adopted to be inserted in said hole, a magnetic core system within said body provided with at least one excitation winding connected to an alternating voltage source and at least one measuring winding connected to a measuring means, said magnetic core system having at least four pole surfaces adjacent the cylindrical surface of the body, all said pole surfaces being situated substantially in the same plane, which plane is parallel with the longitudinal axis of the cylindrical body, the magnetic core system including an H-shaped member, and the excitation winding comprising two parts (7a, 7b) respectively arranged on diametrically opposite straight parts (2a, 2b) of the H-shaped member.

References Cited

UNITED STATES PATENTS

| 3,184,963 | 5/1965 | Dahle | 73—88.5 |
| 3,379,053 | 4/1968 | Berglund et al. | 73—88.5 |

FOREIGN PATENTS

| 184,751 | 7/1966 | Russia. |

CHARLES A. RUEHL, Primary Examiner

U.S. Cl. X.R.

324—34